United States Patent
Weerackody et al.

(10) Patent No.: US 6,807,145 B1
(45) Date of Patent: Oct. 19, 2004

(54) DIVERSITY IN ORTHOGONAL FREQUENCY DIVISION MULTIPLEXING SYSTEMS

(75) Inventors: Vijitha Weerackody, Watchung, NJ (US); Zulfiquar Sayeed, East Windsor, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/488,462

(22) Filed: Jan. 20, 2000

Related U.S. Application Data
(60) Provisional application No. 60/169,173, filed on Dec. 6, 1999.

(51) Int. Cl.$^7$ .............................................. H04J 11/00
(52) U.S. Cl. ...................................... 370/203; 375/346
(58) Field of Search ................................ 370/203, 210, 370/252; 455/91, 101; 375/346, 347, 348, 349

(56) References Cited

U.S. PATENT DOCUMENTS

| | | | | |
|---|---|---|---|---|
| 5,457,712 A | | 10/1995 | Weerackody | 375/347 |
| 5,528,581 A | * | 6/1996 | De Bot | 370/203 |
| 5,610,908 A | | 3/1997 | Shelswell et al. | 370/210 |
| 6,473,393 B1 | * | 10/2002 | Ariyavisitakul et al. | 370/203 |
| 6,535,562 B1 | * | 3/2003 | Mohseni et al. | 375/296 |
| 6,574,283 B1 | * | 6/2003 | Sakoda et al. | 375/262 |
| 2001/0033547 A1 | * | 10/2001 | Izumi | 370/203 |

FOREIGN PATENT DOCUMENTS

EP  0 881 782 A2 * 12/1998  ............ H04B/7/06

OTHER PUBLICATIONS

Li et al. "Transmitter Diversity for OFDM Systems and Its Impact on High–Rate Data Wireless Networks". IEEE Journal on Selected Areas of Communications. Jul. 1999. pp. 1233–1243.*
Tarokh et al. "An Algorithm for Reducing the Peak to Average Power Ratio in a Multicarrier Communications System". IEEE Vechnology Conference. May 16, 1999–May 20, 1999, pp. 680–684.*
Sayeed et al. "Transmit Diversity for Coded OFDM Systems in Single Frequency Networks". IEEE Global Telecommunications. Dec. 5, 1999–Dec. 9, 1999. pp. 852–856.*
Ligeti et al. "Minimal Cost Coverage Planning for Single Frequency Networks". IEEE Transactions on Broadcasting. Mar. 1999. pp. 78–87.*
Kaiser, Stefan. "Spatial Transmit Diversity Techniques for Broadband OFDM Systems". IEEE. Nov. 27, 2000–Dec. 1, 2000. pp. 1824–1828.*

* cited by examiner

*Primary Examiner*—Chi Pham
*Assistant Examiner*—Derrick W Ferris

(57) ABSTRACT

A system and method is disclosed for improving diversity in a multiple transmitter or multiple receiver orthogonal frequency division multiplexing (OFDM) system. Signal diversity is improved by introducing phase offsets at the transmitters and/or the receivers. The phase offsets are unique to each transmitter or receiver. The unique phase offsets are applied to individual symbols of the OFDM signal in the frequency domain.

27 Claims, 6 Drawing Sheets

(A) $\theta_d=0$, $I=2,3$
(B) $\theta_d=5$, $I=2$
(C) $\theta_d=5$, $I=3$ (A) $\theta_d=0$
(B) $\theta_d=5$, $I=2$, $i=-1,1$ (A) $\theta_d=0$
(B) $\theta_d=10$
(C) $\theta_d=5$ (A) $\theta_d=0$
(B) $\theta_d=5$
(C) $\theta_d=10$ (A) $\theta_d=0$
(B) $\theta_d=5$
(C) $\theta_d=10$

DIVERSITY IN ORTHOGONAL FREQUENCY DIVISION MULTIPLEXING SYSTEMS

RELATED APPLICATION

This application claims the benefit of U.S. Provisional Application to Sayeed et al., entitled "Diversity in Orthogonal Frequency Division Multiplexing Systems," filed Dec. 6, 1999, Application No. 60/169,173.

FIELD OF THE INVENTION

The present invention relates to the field of transmission systems. More particularly, the present invention relates to wireless transmission systems.

BACKGROUND OF THE INVENTION

Orthogonal frequency division multiplexing (OFDM) systems are employed or proposed in many commercial wireless data transmission systems, for example, cellular telephones, digital audio broadcasting (DAB), and high-definition television (HDTV). These applications require the transmission of data at very high rates ranging from a few hundred kb/s to a few Mb/s.

OFDM systems are well known in the art of signal transmission. U.S. Pat. No. 5,610,908 to Shelswell et al., entitled "Digital Signal Transmission System Using Frequency Division Multiplex," discloses an OFDM system for signal transmission, and is incorporated herein by reference.

In OFDM systems, a high rate serial data stream is converted to several parallel low rate data streams so that the symbol duration of each of the data symbols transmitted in each of the parallel streams is very large in comparison to the expected channel delay spread. The channel delay spread arises from multipath scattering. Multipath scattering occurs when a transmitter transmits a data pulse and because of the data pulse reflecting off of natural and man-made objects, the data pulse becomes many pulses which arrive at the receiver at different times. The difference in time between the first and last of the multipath data pulses is the channel delay spread. Each one of the parallel data streams are transmitted on a sub-carrier frequency such that the parallel data streams are orthogonal to each other. Since the sub-carrier frequencies of the parallel streams are less than the frequency of the serial data stream, the effects of delay spread are greatly reduced. Hence, unlike in single carrier transmission systems, equalization is not a difficult task in OFDM systems.

In the frequency domain, the bandwidth of each of the parallel data streams in the OFDM system is very small in comparison to the coherence bandwidth of the channel. The coherence bandwidth is the frequency range over which two frequency components will have a strong potential for amplitude correlation and is inversely related to the delay spread. Strong amplitude correlation will result in portions of the channel being "flat" (i.e., having a constant amplitude and linear phase response). Portions where signals cancel each other out are referred to as flat fading regions. Large flat fading regions result in poor signal reception at the receiver. Since the total transmission bandwidth is typically several times larger than the channel coherence bandwidth, some of the parallel data streams within the total transmission bandwidth will be subjected to flat fading regions. The flat fading is referred to as Rayleigh fading. Rayleigh fading arises from the transmitted signal being reflected off of different objects and arriving at a receiver at different times. These multipath signals create standing waves at the receiver and result in poor signal reception. The bit error rate (BER) of a signal tends to increase as a function of Rayleigh fading. Flat fading regions due to multipath signals creating standing waves will also arise in multiple transmitter systems where each transmitter is transmitting the same signal.

FIG. 1A illustrates a prior art orthogonal frequency division multiplexing (OFDM) system transmitter 10 for use in a single frequency network (SFN) of transmitters. A SFN comprises more than one transmitters transmitting the same OFDM signal in order to increase broadcast coverage. In transmitter 10, data bits 12 are initially received at the transmitter 10. The data bits 12 are then encoded using a convolutional coder 14 which encodes the data bits 12 into a continuous bit stream (1s and 0s) in a known manner using an error protection code. After encoding, the continuous bit stream is phase shift keyed using a phase shift keying PSK modulator 16 to obtain a stream of data symbols.

The data symbols are then frequency interleaved using frequency interleaver 18 to randomize the data. Interleaving is a data communication technique used in conjunction with error protection codes to reduce errors. In the interleaving process, coded data symbols are reordered before transmission in such a manner than any two successive coded data symbols are separated in the transmitting sequence. Upon reception, the interleaved coded data symbols can be reordered in their original sequence, thus effectively spreading or randomizing the errors in time to enable more complete correction by a random error protection code.

The symbols are then differentially encoded using differential coder 20. Differential encoding assists in making the data signal insensitive to phase distortion. The differentially encoded complex symbols are then fed into an inverse fast Fourier transformer 22. The inverse fast Fourier transformer 22 shifts the data symbols from the frequency domain to the time domain for data transmission. The signal generated by the inverse fast Fourier transformer 22 is an orthogonal signal in the time domain suited for data transmission. The time domain signal is then transmitted by antenna 24.

FIG. 1B illustrates a prior art orthogonal frequency division multiplexing (OFDM) system receiver 30 for receiving signals from a single frequency network (SFN) of transmitters. In the receiver 30, an OFDM signal is received at a receiver circuit 34 through antenna 32. The OFDM signal is then transformed from the time domain to the frequency domain by fast Fourier transform (FFT) 36. The transformed signal is then differentially decoded and de-interleaved by differential decoder 38 and de-interleaver 40, respectively. Next the signal is passed through a PSK de-modulator 42 to convert the complex symbols back into a bit stream. The bit stream is then decoded by convolutional decoder 44 to obtain the original data bits 12 from transmitter 10.

To improve signal reception, many OFDM systems, such as digital audio broadcasting (DAB) systems, use a single frequency network (SFN) of transmitters broadcasting identical signals in the same frequency band with the transmitters synchronized in time. The signals from these different transmitters appear as multi-path energy at the receiver and may improve signal reception because of frequency diversity.

Frequency diversity schemes are used to develop information from several signals transmitted over independently fading paths. The independently fading paths are combined to reduce the effects of flat fading regions. This scheme minimizes the effects of flat fading regions since flat fading regions seldom occur simultaneously during the same time interval on two or more paths.

The transmit power and the distance between the transmitters in a SFN are carefully designed so that the signal paths from the different transmitters arrive within a specified guard interval of an OFDM frame so that intersymbol interference from adjacent OFDM frames can be avoided. In a SFN, depending upon the path delays, the combination of signal energies from two or more transmit stations may lead to destructive addition of some frequencies of the signal at the receiver. In channels that have very small delay spreads this destructive addition of the signals will give rise to very poor performance gains.

In a multipath environment, if the signals from the transmit stations have very small delay spreads, frequency diversity is unavailable. To illustrate the effects of small delay spreads consider the following example for a digital audio broadcasting DAB system in a single frequency OFDM network. Consider two stations transmitting a 4 MHz wide signal centered at a frequency of 2.4 GHz. If the receiver has only line-of-sight reception from both transmit stations and is located equi-distant from the two transmit stations, at this location, as long as the path delay spread is not large (i.e., <50 m, corresponding to a delay difference of 0.167 $\mu$s (50 m/speed of light)), the receiver will experience a flat fading channel without any frequency diversity in the 4 MHz bandwidth of the signal, due to the coherence bandwidth being approximately 6 MHz $\{[50 \text{ m}/(300 \text{ Mm/sec})]^{-1} \approx 6 \text{ MHz}\}$ which totally encompasses the bandwidth of the transmitted signal. Thus, in this case the performance of the single frequency network (SFN) will be poor. Even if the path difference between the two transmit stations is about 100 m, which corresponds to a delay difference of 0.33 $\mu$s or channel coherence bandwidth of about 3 MHz, the performance of the system will be poor because of inadequate frequency diversity.

SUMMARY OF THE INVENTION

The present invention discloses a method for increasing the performance of an OFDM single frequency network containing multiple transmitters. Increased performance in the OFDM system is accomplished by applying time varying offsets unique to each transmitter on the frequency components of a data signal. Varying the offsets of the frequency components at the individual transmitters decreases the correlation coefficient of the system, effectively reducing the coherence bandwidth. By reducing the coherence bandwidth, flat fading regions due to Rayleigh fading and signal cancellation between transmitters can be reduced, thus providing superior performance.

The method comprises the steps of generating a stream of complex symbols, adding a phase rotation to the complex symbols at individual transmitters where the phase rotation is unique to the individual transmitters, transforming the phase rotated complex symbols from the frequency domain to the time domain, and transmitting the time domain signal from the multiple transmitters.

The broadcast system is comprised of multiple transmitters. Each transmitter receives the same stream of data to be transmitted. Each transmitter has a coder for generating a differential encoded complex symbol at each transmitter, a rotator for adding a phase rotation to the differentially encoded complex symbol, and an inverse fast Fourier transform for transforming the differentially encoded complex symbol from the frequency domain to the time domain.

The present invention can also be incorporated into multiple receivers receiving a signal from a single transmitter or from multiple transmitters.

DETAILED DESCRIPTION OF THE INVENTION

The present invention discloses a method and apparatus for increasing diversity in a single frequency network of transmitters. By increasing the diversity of the system, the level of correlation between transmitted signals is reduced, thus reducing the coherence bandwidth of the system. By reducing the coherence bandwidth, flat fading effects due to Rayleigh fading and signal cancellation between transmitters can be diminished.

Figure 1A:
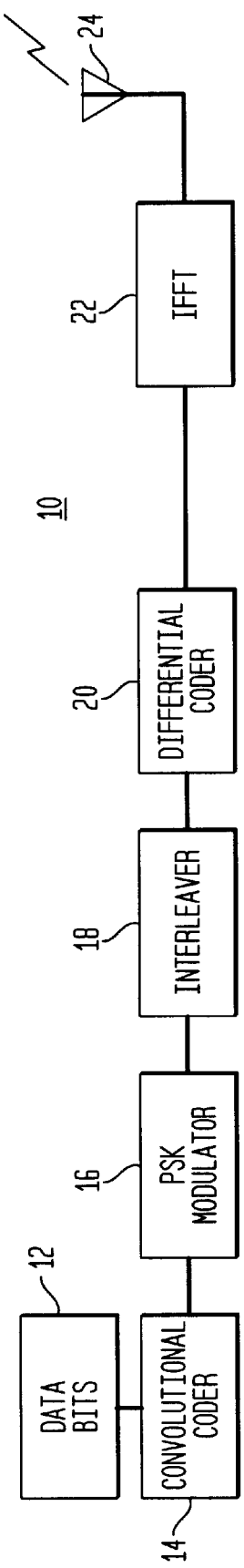
FIG. 1A is a block diagram of an orthogonal frequency division multiplexer (OFDM) transmitter of the prior art.
Figure 1B:
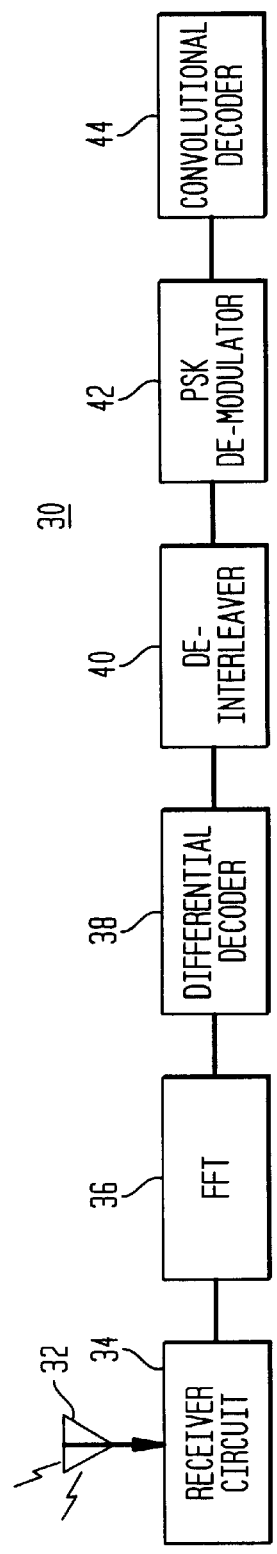
FIG. 1B is a block diagram of an orthogonal frequency division multiplexer (OFDM) receiver of the prior art.
Figure 2A:
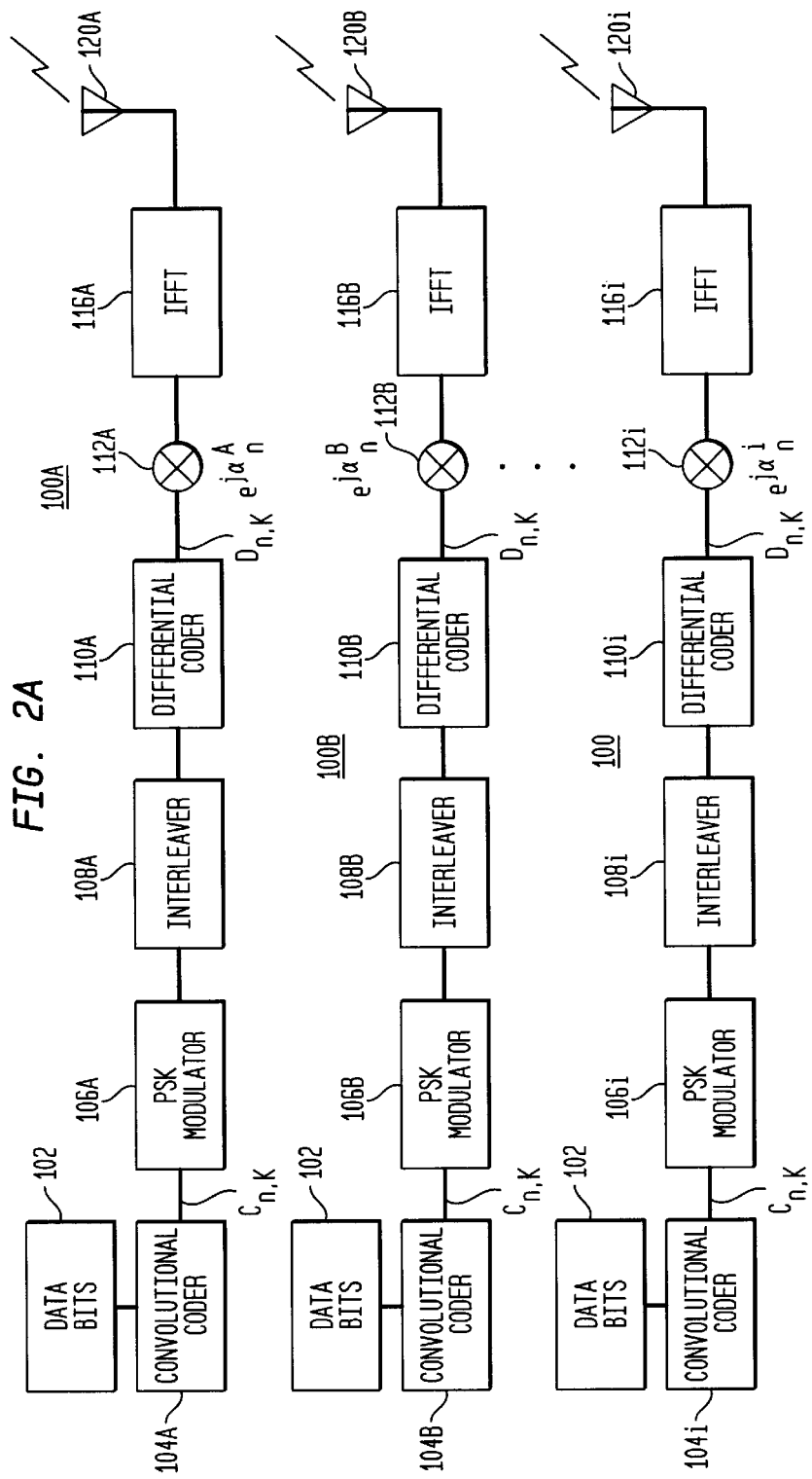
FIG. 2A is a block diagram of OFDM transmitters with phase rotation in a single frequency network (SFN) in accordance with the present invention.

FIG. 2A illustrates a preferred embodiment of orthogonal frequency division multiplexing (OFDM) system transmitters 100A, 100B, . . . , 100$i$ in a single frequency network (SFN) in accordance with the invention. For descriptive purposes only transmitter 100A will be described, however, transmitters 100B through 100$i$ operate in a similar manner. In transmitter 100A, data bits 102 are initially received at the transmitter 100A. The data bits 102 are then encoded using a convolutional coder 104A which encodes the data bits 102 in a known manner. The convolutional coder 104A encodes the data bits 102 into a continuous bit stream (1s and 0s) using an error protection code. In the preferred embodiment, a data frame is defined to contain 2000 data bits. After encoding, the data frame is phase shift keyed using a phase shift keying (PSK) modulator 106A. In the preferred embodiment, the data bits of the data frame are pair-wise mapped into a four point constellation using quadrature phase shift keying (QPSK) to obtain complex symbols in which each symbol represents a real and an imaginary component. By QPSK, the original 2000 data bits can be represented as 1000 complex symbols. It will be readily apparent to one skilled in the art that other types of modulators, such as a quadrature amplitude modulator (QAM), could be used instead of a PSK modulator without departing from the spirit of the present invention.

Next, the complex symbols are frequency interleaved using frequency interleaver 108A to randomize the data. The complex symbols are then differentially encoded using differential coder 100A. Differentially encoding the complex symbols assists in making the complex data signal insensitive to phase distortion.

The differentially encoded complex symbols are then individually rotated by rotator 112A, with each transmitter 100A through 100$i$ introducing phase offsets to the complex symbols which are unique for each transmitter 100A through 100$i$, to obtain unique phase offsets for the symbols at each SFN transmitter 100A through 100$i$. The rotated differentially encoded complex symbols are then fed into an inverse fast Fourier transformer (IFFT) 116A. The IFFT 116A shifts the data symbols from the frequency domain to the time domain for data transmission. The signal generated by the IFFT 116A is an orthogonal signal in the time domain suited for data transmission. The time domain signal is then transmitted by antenna 120A.

Figure 2B:
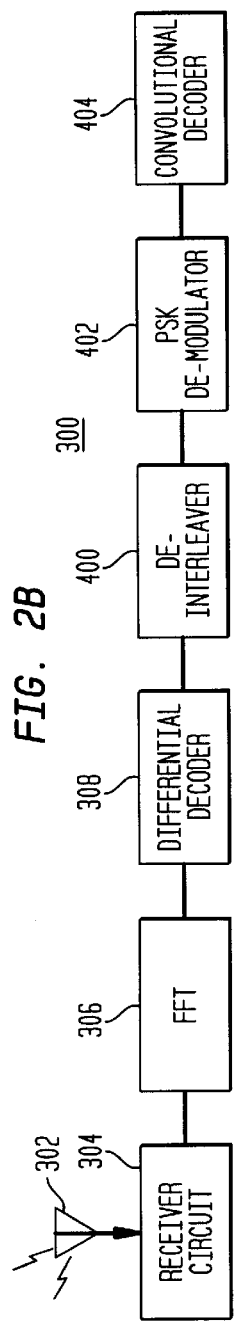
FIG. 2B is a block diagram of an OFDM receiver for receiving a signal from a SFN in accordance with the present invention.

FIG. 2B illustrates an orthogonal frequency division multiplexing (OFDM) system receiver 300 for receiving signals from a single frequency network (SFN) of transmitters. The receiver used in the preferred embodiment may be a known receiver capable of receiving and decoding an OFDM signal. In the receiver 300, an OFDM signal is received at a receiver circuit 304 through antenna 302. The OFDM signal is then transformed from the time domain to the frequency domain by fast Fourier transform (FFT) 306. The transformed signal is then differentially decoded and de-interleaved by differential decoder 308 and de-interleaver 400, respectively. Next the signal is passed through a PSK de-modulator 402 to convert the complex symbols back into a bit stream. It will be readily apparent to one skilled in the art that other types of de-modulators, such as a QAM de-modulator, could be used depending on the type of modulator used in the transmitter without departing from the spirit of the present invention. The bit stream is then decoded by convolutional decoder 404 to obtain the original data bits 102 from transmitter 100A through 100$i$. Note that additional circuitry is not required at receiver 300 to handle the phase rotation introduced by rotators 112A through 112$i$ in transmitters 100A through 100$i$, respectively.

By introducing phase offsets through rotator 112A through 112$i$ to the data symbols which are unique to the multiple transmitters 100A through 100$i$, the present invention applies time varying offsets to the frequency components of the OFDM signal. By applying time varying offsets to the frequency components, the correlation of the data from the multiple transmitters is effectively reduced, thus offering improvements over the prior art in terms of frequency diversity.

Figure 2C:
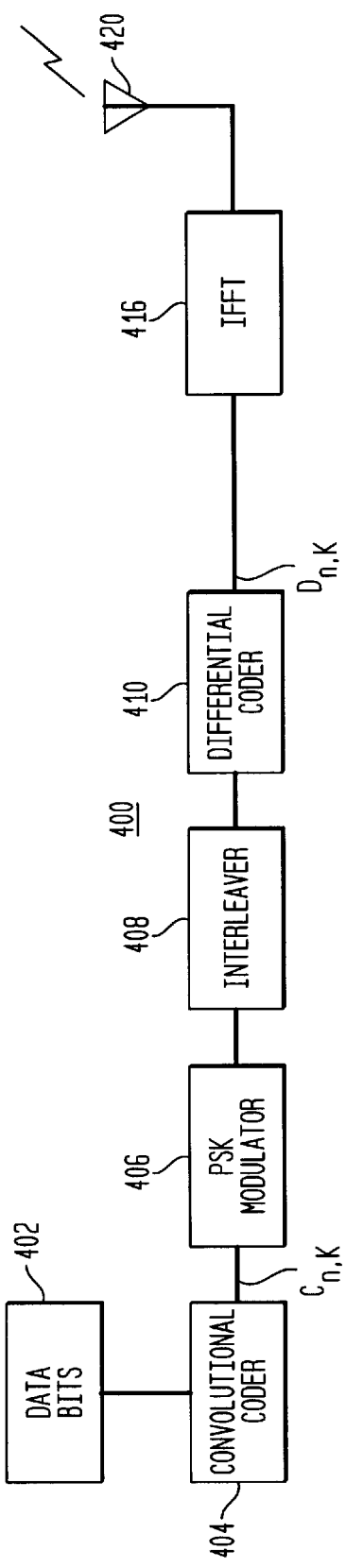
FIG. 2C is a block diagram of an OFDM transmitter in a multiple receiver transmission system in accordance with the present invention.

The present invention can also be incorporated in multiple receivers receiving a signal from a single transmitter. FIG. 2C illustrates an embodiment of an orthogonal frequency division multiplexing (OFDM) system transmitter 400 for use with multiple receivers. The transmitter used in this embodiment may be a known transmitter capable of encoding and transmitting an OFDM signal. In transmitter 400, data bits 402 are initially received at the transmitter 400. The data bits 402 are then encoded using a convolutional coder 404 which encodes the data bits 402 into a continuous bit stream (1s and 0s) in a known manner using an error protection code. After encoding, the continuous bit stream is phase shift keyed using a phase shift keying (PSK) modulator 406 to obtain a stream of data symbols. Different types of modulators, such as quadrature amplitude modulation (QAM) modulators, could be used for modulator 406, without departing from the spirit of the present invention.

The data symbols are then frequency interleaved using frequency interleaver 408 to randomize the data. Interleaving is a data communication technique used in conjunction with error protection codes to reduce errors. The symbols are then differentially encoded using differential coder 410. Differential encoding assists in making the data signal insensitive to phase distortion. The differentially encoded complex symbols are then fed into an inverse fast Fourier transformer 416. The inverse fast Fourier transformer 416 shifts the data symbols from the frequency domain to the time domain for data transmission. The signal generated by the inverse fast Fourier transformer 416 is an orthogonal signal in the time domain suited for data transmission. The time domain signal is then transmitted by antenna 418.

Figure 2D:
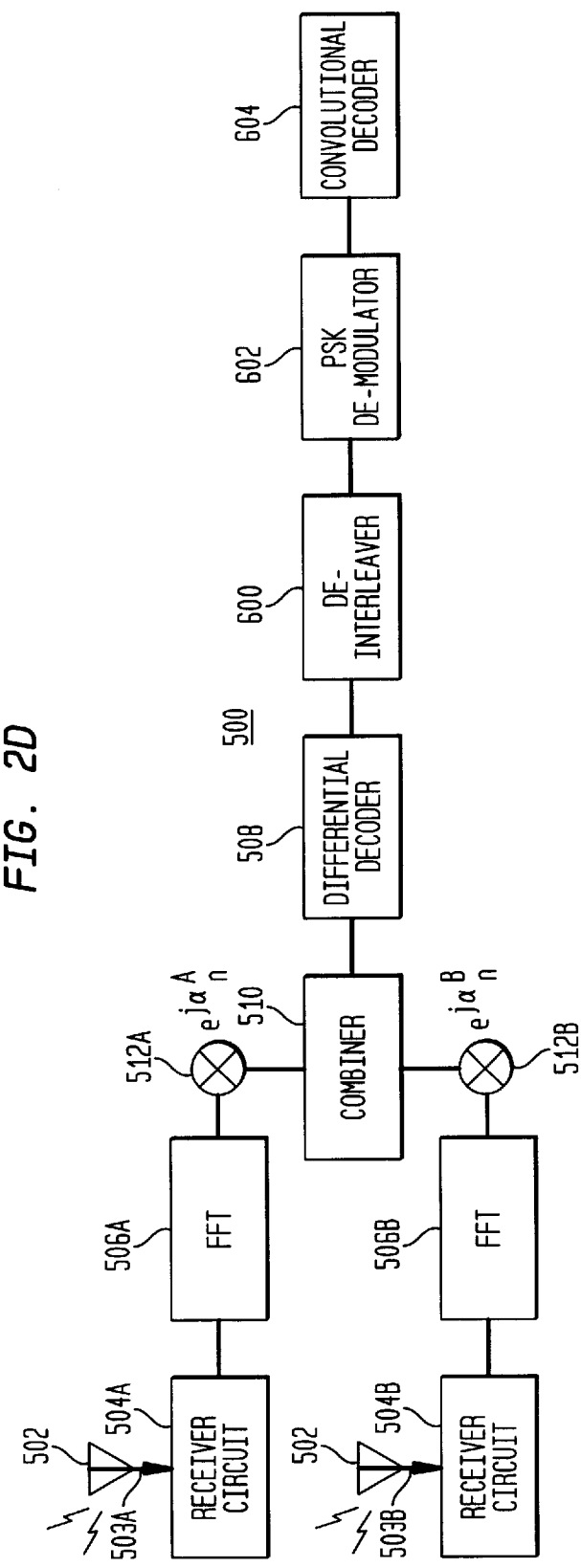
FIG. 2D is a block diagram of OFDM receivers in a multiple receiver transmission system with phase rotation in accordance with the present invention.

FIG. 2D depicts an embodiment of a receiver system 500 for receiving a differentially encoded OFDM signal from transmitter 400. The receiver system 500 comprises two antennas 503A, 503B for independently receiving the differentially encoded OFDM signal 502 to form two independent differentially encoded OFDM signals. The independent OFDM signals are passed from the two antennas 503A, 503B to receiver circuits 504A, 504B, respectively. The OFDM signals are then transformed from the time domain to the frequency domain by fast Fourier transformers 506A, 506B, respectively. Rotators 512A, 512B then separately phase rotate the individual symbols out of fast Fourier transformers 506A, 506B, respectively. Although two antennas 503A, 503B, receiver circuits 504A, 504B, fast Fourier transformers 506A, 506B, and rotators 512A, 512B are used in the present embodiment, many more antennas, receiver circuits, fast Fourier transformers, and rotators could be employed in accordance with the present invention.

The signals are then combined in combiner 510 and decoded. The process of decoding comprises differentially decoding in differential decoder 508, de-interleaving in de-interleaver 600, de-modulating in PSK de-modulator 602, and convolutional decoding in convolutional decoder 604. The decoding process is essentially the reverse of the coding process. Note that by introducing phase rotation at the rotators 512A, 512B in the receiver system 500, signal diversity can be introduced without adding phase rotation circuitry in the transmitter 400.

It will be apparent to those in the art that variations to the transmitter and receiver circuits can be made without departing from the spirit of the present invention. For example, systems substituting a QAM modulator and de-modulator for PSK modulator 406 and PSK de-modulator 602 in FIGS. 2C,D, respectively, would still be in accordance with the present invention. Also, a plurality of transmitters and/or a plurality of receivers can be used to implement the present invention.

In addition, it will be understood by those in the art that, with the exception of the analog-to-digital (A/D) converters and the digital-to-analog (D/A) converters, all of the components in the transmitters and receivers identified in the detailed description and depicted in FIGS. 2A–D can be implemented in hardware, software running on a processor or processors, or a combination of hardware and software. The processing performed by the processor or processors can be accomplished by any of the following types of apparatus: microprocessor, microcontroller, processor, digital signal processor, computer, state machine, or essentially any digital processing circuit. The A/D and D/A converters can be implemented using discrete components or solid state technologies.

Implementation of Rotation

In FIG. 2A, a phase shift keying (PSK) system is assumed so that $D_{n,k}=C_{n,k}D_{n-1,k}$, where $D_{n,k}$ is the complex data symbol component in the nth sub-carrier in the $k^{th}$ OFDM frame and $C_{n,k}$ is the corresponding input at the PSK modulator 106A–$i$. In the preferred embodiment, each OFDM frame comprises 1000 sub-carriers. The transmitted baseband signal for the $k^{th}$ OFDM frame is denoted by $s_k(t)$ $$s_k(t) = \frac{1}{\sqrt{T_s}} \sum_{n=0}^{N-1} D_{n,k} e^{j2\pi \frac{n}{T_s} t} \quad t \in [kT_o, (k+1)T_o] \quad (1)$$

where $T_o$, the duration of an OFDM frame, is given by the sum of symbol interval $T_s$ and a guard interval $T_g$. The number of sub-carriers is N and the total bandwidth of the transmitted signal is approximately $N/T_s$. Implementation of (1) is accomplished using an inverse discrete Fourier transform (IDFT).

The time varying channel response from the $i^{th}$ transmit station in the $k^{th}$ OFDM symbol interval is given as $$h_k^i(t) = \sum_{l=0}^{L-1} h_{kl}^i \delta(t - \tau_{kl}^i) \quad (2)$$

where it is assumed that the channel is constant over the OFDM symbol interval $T_s$. For descriptive purposes, the digital audio broadcasting (DAB) proposed for North America Broadcasts will be used, however, the proposed diversity technique will be readily applicable in other SFN OFDM systems. In a system such as the proposed North America DAB system, we are interested in $T \approx 270 \mu s$ and the channel characteristics will be constant over this symbol duration even at reasonably high mobile speeds. It is also assumed that the path delays, $\tau_{k1}^i$, are smaller than the guard interval, $T_g$, so that intersymbol interference can be avoided. If there are a large number of sub-carriers the fading experienced by each sub-carrier will be a constant. The frequency response of the channel at the nth sub-carrier and at the $k^{th}$ OFDM symbol interval is denoted by $H_{n,k}^i$. Using this and (1) the received baseband signal for the $k^{th}$ OFDM symbol can be written as $$s'(t) = \frac{1}{\sqrt{T_s}} \sum_{i=0}^{I-1} \sum_{n=0}^{N-1} H_{n,k}^i D_{n,k} e^{j2\pi \frac{n}{T_s} t} + v_k(t) \quad t \in [kT_o(k+1)T_o] \quad (3)$$

$$0 \quad \text{otherwise}$$

where I is the number of transmit stations from which a receiver receives signals of appreciable energy and $v_k(t)$ is additive white Gaussian noise (AWGN). AWGN is noise having a frequency spectrum that is continuous and uniform over a specified frequency band. At the receiver, the samples $s'_k$ ($k'T_s/N$); $k'=0, 1, \ldots, N-1$, are transformed using a discrete Fourier transform (DFT) and the resulting output can be given as $$R_{n,k} = \sum_{i=0}^{I-1} H_{n,k}^i D_{n,k} + V_{n,k} \quad (4)$$

In the above, $V_{n,k}$ is the AWGN component. Note that in the above formulation we have ignored timing and carrier frequency offsets. $R_{n,k}$ is then differentially decoded, deinterleaved and finally channel decoded. The output of the differential decoder is given by $$\hat{C}_{n,k} = R_{n,k} R_{n-1,k}^* \quad (5)$$
$$= \sum_{i_1,i_2} H_{n,k}^{i_1} H_{n,k}^{i_2} C_{n,k} + V'_{n,k}$$

where $V'_{n,k}$ is the noise component due to AWGN. The effective complex channel gain component is denote by $\Gamma_{n,k} = \Sigma_{i1,i2} H_{n,k}^{i1} H_{n-1,k}^{i2}$. The performance of the channel decoder depends on the correlation of its input symbols. When the symbols at the input of the deinterleaver have a large degree of correlation the deinterleaver may not be able to decorrelate the symbols at its output. If the channel frequency response coefficients, $H_{n,k}^i$, form a wide-sense stationary process, then the correlation coefficient of $\Gamma_{n,k}$ is $$p(n', k') = \frac{E\{T_{n,k} T_{n+n', k+k'}^*\} - E\{T_{n,k}\} E\{T_{n+n', k+k'}^*\}}{E\{|T_{n,k}|^2\} - |E\{T_{n,k}\}|^2} \quad (6)$$

In this case indices n' and k' represent the frequency and time domains, respectively.

From (5) it can be seen that the effective channel component at the receiver is $\Gamma_{n,k} = \Sigma_{i1,i2} H_{n,k}^{i1} H_{n-1,k}^{i2*}$. Considering the special case of flat fading channels from all the transmitters, since $\Gamma_{n,k}$ is a constant for all values of n in a given OFDM symbol, frequency diversity is not available. However, in principle, since there are I transmit stations it should be possible to obtain $I^{th}$ order transmit diversity. If the sub-carrier components of each transmit station are given a distinct phase offset, that is, $D_{n,k}$ is modified to $D_{n,k} e^{j\alpha}$, where $\alpha$ is the phase angle applied to the data symbol of the $n^{th}$ sub-carrier at the $i^{th}$ transmitter. At the receiver, the $n^{th}$ sub-carrier component in the $k^{th}$ OFDM symbol is now given by $$R_{n,k} = \sum_{i=0}^{I-1} H_{n,k}^i e^{j\alpha_n^i} D_{n,k} + V_{n,k} \quad (7)$$

In flat fading channels, even though $H_{n,k}^i$ is constant for different values of n, it can be seen that $\Sigma_{i=0}^{I-1} H_{n,k}^i e^{j\alpha}$ will vary with n. This is diversity across the sub-carriers and can be utilized to improve the performance of a coded OFDM system. Note that the phase offsets introduced at the transmitters will complicate the demodulation process at the receiver. Since we are employing differential decoding, the phases, $\alpha_n^i$, should be such that the component $\Sigma_{i=0}^{I-1} H_{n,k}^i e^{j\alpha}$ has little variations for successive values of n. That is $(\alpha_n^i - \alpha_{n-1}^i)$ should be small. Using computer simulations it may be observed that a 5 degree value for the above difference is sufficient to give satisfactory differential decoding performance as well as to obtain the necessary diversity benefit.

Using (5) and (7), the output of the differential detector is $$\hat{C}_{n,k} = \sum_{i_1,i_2} H_{n,k}^{i_1} H_{n-1,k}^{i_2} e^{j(\alpha_n^{i_1} - \alpha_{n-1}^{i_2})} C_{n,k} + V''_{n,k} \quad (8)$$

where $V''_{n,k}$ is the noise component at the differential detector output due to AWGN. The effective complex channel gain at the differential detector output is now given by $\Gamma^{n,k} = \Sigma_{i1,i2} H_{n,k}^{i1} H_{n-1,k}^{i2*} e^{j(\alpha - \alpha)}$.

In this section we assume Rayleigh fading channel characteristics in (2) and derive expressions for the correlation coefficient, $\rho(n',k')$, defined in (6). From (2) we have for the channel frequency response from the $i^{th}$ transmitter in the $k^{th}$ OFDM symbol interval $$H_k^i(f) \sum_{l=0}^{L-1} h_{kl}^i e^{-j2\pi f \tau_{ki}^i} \qquad (9)$$

Since the sub-carrier spacing is $1/T_s$ the sampled channel frequency response is $$H^i(n,k) \sum_{l=0}^{L-1} h_{kl}^i e^{-j2\pi(\tau_{ki}^i/T_s)n} \qquad (10)$$

Note that in this case the sub-carrier frequencies are indexed by n, and k represents the OFDM symbols. If the correlation of the channel for different frequency components in the kth symbol is defined as $$C_k^i(n') = E\{H^i(n,k)H^{i*}(n+n',k)\} \qquad (11)$$

$$= \sum_{l=0}^{L-1} E\{|h_{kl}^i|^2\} E\{e^{j2\pi(\tau_{ki}^i/T_s)n'}\}$$

where the complex channel gains, $h_{k1}^i$, are zero-mean and independent of each other as well as independent of the delays. For illustration, we will assume the OFDM symbol will have a large number of sub-carriers. In the proposed North American terrestrial digital audio broadcasting DAB system there are about 1000 sub-carriers in an OFDM symbol. We already assumed that the time variations of the sub-carrier components within an OFDM symbol duration are negligible. As seen from (7) this transmit diversity technique affects the correlation across the sub-carrier components. For the reasons set forth above, we are interested only in the variation of the correlation coefficient for different values of the frequency index, n', and not the time index, k'. Since we are not considering the correlation for different values of the time index, the correlation coefficient that we are computing is $\rho(n',0)$, denoted by $\rho(n')$. Since we are assuming a Rayleigh fading channel, the frequency response components $H^i(n,k)$ in (10) form a zero-mean complex-valued Gaussian process. Let us choose the phases, $\alpha_n^i$, from a wide-sense stationary process such that the phase increment at the $n^{th}$ sub-carrier, $\Delta\alpha_n^i=(\alpha_{n+1}^i-\alpha_n^i)$, is independent for all values of n. Using the above it can be shown that $$\rho(n') = \frac{\left|\sum_{i=0}^{I-1} C_k^i(n') E\{e^{j(\alpha_n^i - \alpha_{n+n'}^i)}\}\right|^2}{\left|\sum_{i=0}^{I-1} C_k^i(0)\right|^2} \qquad (12)$$

Next, consider the case where the transmit channels are statistically similar and let us assume that the channel delays, $\tau_{k1}^i$, are uniformly distributed in $(0,\tau_d)$. In this case, from (11) the correlation of channel frequency response can be written as $$C_k(n') = \sum_{l=0}^{L-1} E\{|h_{kl}^i|^2\} e^{j\pi(\tau_d/T_s)n'} \frac{\sin\pi(\tau_d/T_s)n'}{\pi(\tau_d/T_s)n'} \qquad (13)$$

where the index i in $C_k^i(n')$ has been dropped.

Three potential methods for varying the phase angle, $\alpha_n^i$, will be presented. However, it will be readily apparent to those skilled in the art that other methods could be used to vary the phase angle which would produce desirable signal diversity characteristics. The phase angles are chosen in either a random manner or deterministically.

First Method: $\alpha_n^i = in\theta_d$

In this case a linear phase variation across the sub-carrier components is inserted, that is $$\alpha_n^i = in\theta_d \qquad (14)$$

where $\theta_d$ is the step-size. Using this and (13) in (12), it can be shown that $$\rho(n') = \left(\frac{\sin\pi(\tau_d/T_s)n'}{\pi(\tau_d/T_s)n'}\right)^2 \left(\frac{\sin n'I\theta_d/2}{I\sin n'\theta_d/2}\right)^2 \qquad (15)$$

Figure 3:
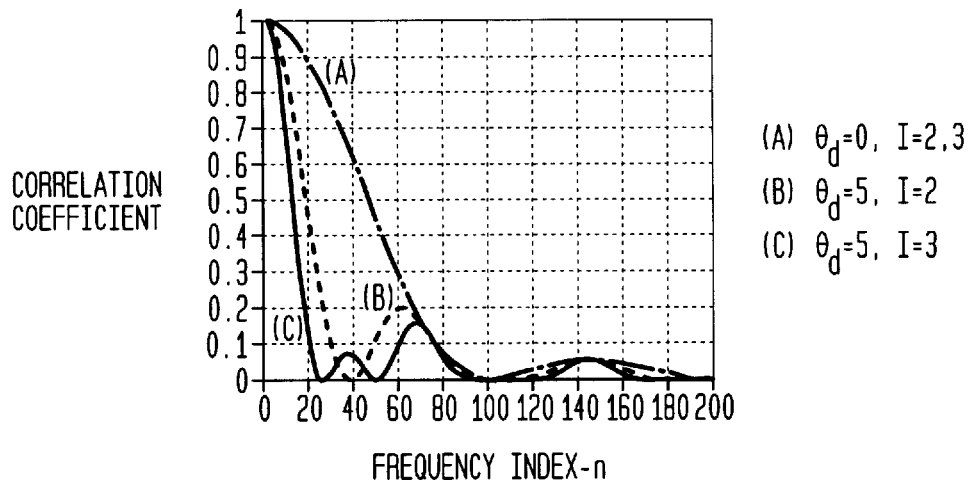
FIG. 3 is a graph illustrating de-correlation gains in a Rayleigh fading channel for multiple transmitters in accordance with the present invention.

In FIG. 3, we plot the above correlation coefficient for two and three (I=2,3) transmitter cases. Since we assumed the transmit paths are statistically identical, when $\theta_d=0$, the correlation will be independent of the number of transmitters and will be given by $C_k(n')$ for the transmit channels $\tau_d=T_s=0.01$. In the North American DAB system, $T_s=250\,\mu s$, therefore, $\tau_d=2.5\,\mu s$. In the absence of the diversity scheme ($\theta_d=0$), the correlation coefficient drops below 0.2 when the sub-carrier spacing is more than about 63. It can be seen that with two transmitters the correlation coefficient drops below 0.2 for sub-carrier spacings of more than 28 and with three transmitters this number is about 16 sub-carriers. Therefore, significant performance improvements can be obtained using this diversity scheme. In a preferred embodiment, to obtain the best performance from the channel decoder, the correlation coefficient should be an impulse-like function. Note that larger values of $\theta_d$ give improved correlation properties, however, this is detrimental to current DPSK decoders. In this case, we used $\theta_d=5$ deg., that is, the nth sub-carrier will have a phase component given by 0 deg. at the first transmitter, 5×n deg. at the second transmitter and 10×n deg. at the third transmitter. For this case, this is statistically identical to applying phase offsets such as 2.5×n deg. at one transmitter and −2.5×n deg. at another transmitter for the nth sub-carrier at the transmitters in a two transmitter case, or 5×n deg., 0 deg., and −5×n deg. for the nth sub-carrier at respective transmitters in a three transmitter case.

Note that the linear phase variation given in (14) is a simple delay at the transmitter. However, since we are introducing these phase offsets on the complex data symbols, $D_{n,k}$, this will not add to the path delays and will not contribute to intersymbol interference in channels which have large path delays. Also, because this is a delay, in some cases, it could negate the channel diversity available because of the path differences.

Second Method: $\alpha_n^i - \alpha_{n-1}^i = i\theta_n$ #1

In this case, we will assume a random variation for the phase difference between successive sub-carriers, that is $$\alpha_n^i - \alpha_{n-1}^i = i\theta_n \qquad (16)$$

where $\theta_n$ is an independent random process and is uniformly distributed in $[0, \theta_d]$. In this case it can be seen that $$\rho(n') = \frac{|C_k(n')|^2}{|C_k(0)|^2} \left|\frac{1}{I}\sum_i \left(e^{-ji\theta_d/2} \frac{\sin i\theta_d/2}{i\theta_d/2}\right)^{n'}\right|^2 \qquad (17)$$

For the special case when there are two transmitters, that is I=2 and the index i=−1,1, and using $C_k(n')$ in (13), $$p(n') = \left(\frac{\sin\pi(\tau_d/T_s)n'}{\pi(\tau_d/T_s)n'}\right)^2 \left(\frac{\sin\theta_d/2}{i\theta_d/2}\right)^{n'/2} \qquad (18)$$

Figure 4:
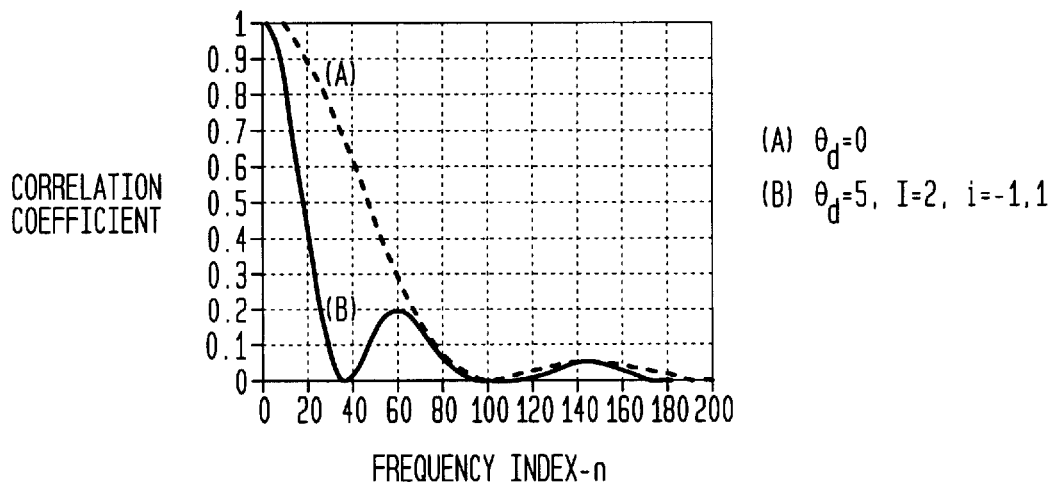
FIG. 4 is a graph illustrating de-correlation gains in a Rayleigh fading channel for two transmitters in accordance with the present invention.

FIG. 4 depicts this for $\theta_d$=5 deg. It can be seen that, as in the previous case, the correlation coefficient is significantly decreased.

Third Method: $\alpha^i_n - \alpha^i_{n-1} = i\theta_n$ #2

Consider a random walk variation for $\alpha^i_n$, that is $$\alpha^i_n - \alpha^i_{n-1} = i\theta_n \qquad (19)$$

In this case, $\theta_n$ is an independent process and assumes the values $\pm\theta_d$ with equal probability. Using this it can be shown that $$p(n') = \frac{|C_k(n')|^2}{|C_k(0)|^2} \frac{1}{I} \left|\sum_i (\cos i\theta)^{n'}\right|^2 \qquad (20)$$

For the special case of two transmitters, I=2 and i=−1,1 we have $$p(n') = \left(\frac{\sin\pi(\tau_d/T_s)n'}{\pi(\tau_d/T_s)n'}\right)^2 (\cos\theta_d)^{2n'} \qquad (21)$$

Simulation Results

We now present simulation results to demonstrate the performance gains obtained using the transmit diversity technique of the present invention. In the simulations we consider the proposed North American terrestrial DAB system. In this case N=1000, that is, there are 1000 sub-carriers in an OFDM symbol and the symbol duration interval is T s=250 $\mu$s. The total bandwidth is 4 MHz and this is centered at 2.4 GHz. We use a 4DPSK system with an interleaver of size 125×16, that is, one interleaver block contains a single OFDM symbol. In these simulations, we employ a 256-state, rate 1/2 convolutional code. The terrestrial OFDM repeaters are assumed to be spaced 15 km apart.

Figure 5:
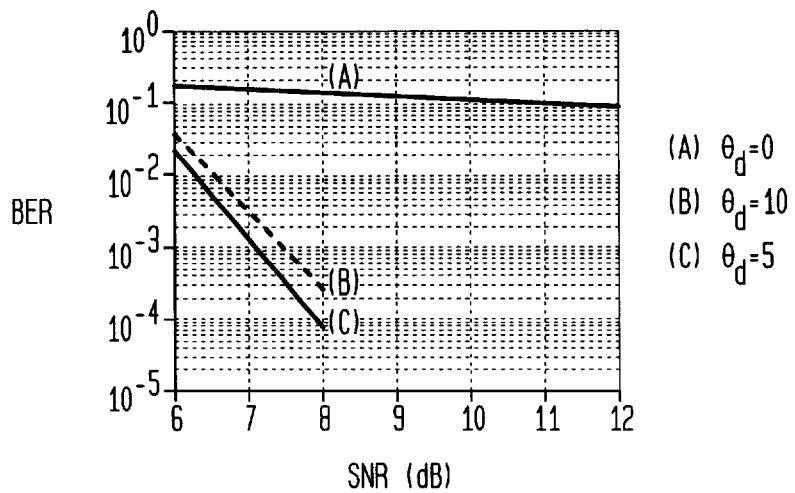
FIG. 5 is a graph illustrating bit error rate (BER) performance gains for a receiver located equi-distant from two transmitters in accordance with the present invention.
Figure 6:
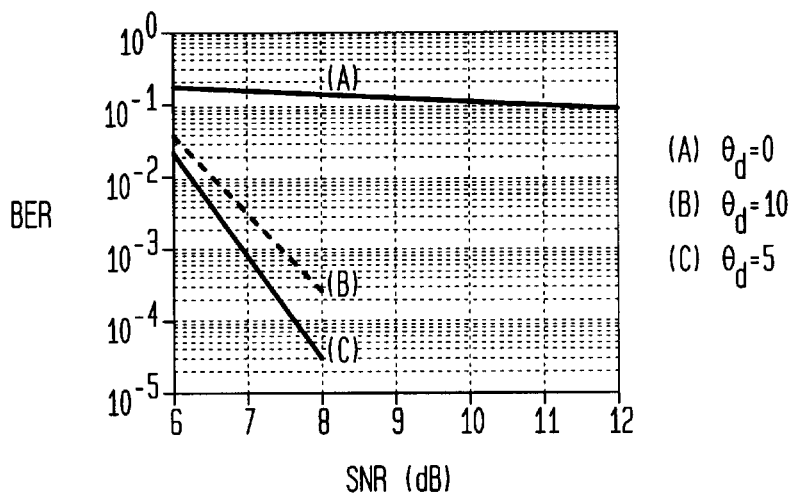
FIG. 6 is a graph illustrating BER performance gains for a receiver located 200 meters from the center of two transmitters in accordance with the present invention.
Figure 7:
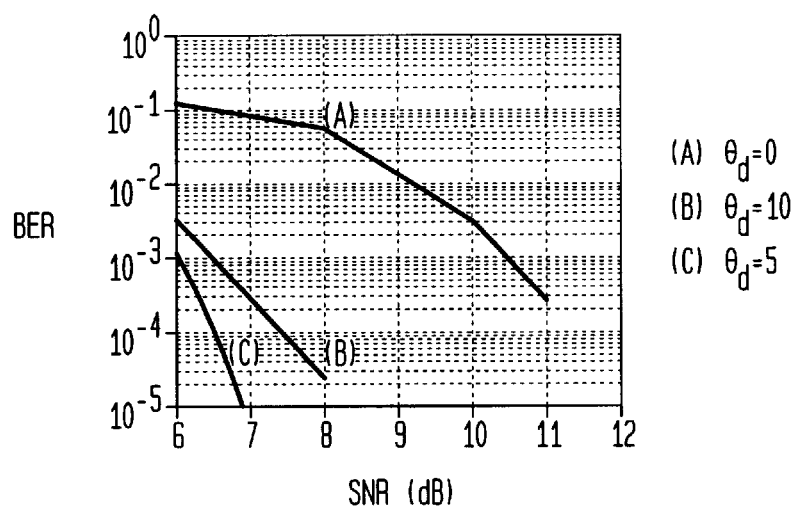
FIG. 7 is a graph illustrating BER performance gains for a receiver located 1500 meters from the center of two transmitters in accordance with the present invention.

First we consider the line-of-sight case from two transmitters. The receiver in this case will see strong direct signals from both transmitters and because of the differential path delays this leads to a standing wave pattern in space. FIGS. 5, 6 and 7 depict the bit error rates (BERs) at the center of the two transmit stations, 200 m from the center, and 1500 m from the center, respectively. In these cases we considered the situation when a mobile receiver is moving at 100 km/h toward one of the transmitters. The phase offsets introduced are linear as given in (14) with $\theta_d$=0, 5 and 10 deg. As can be seen from FIGS. 5 and 6, when close to the center, the performance of the OFDM system is extremely poor and approaches an error flow at a BER of about 10 performance gains. Note that the performance of the diversity scheme for $\theta_d$=5 deg. is better than for $\theta_d$=10 deg. This is because of the large phase variations between successive sub-carrier components and the resulting difficulty in differential decoding the signal. FIG. 7 shows the performance when the receiver is located 1500 m from the center position. Because of the path delay difference the OFDM system works well even in the absence of the transmit diversity technique. However, as can be seen the transmit diversity scheme gives about a 5 dB gain at a BER=10

Figure 8:
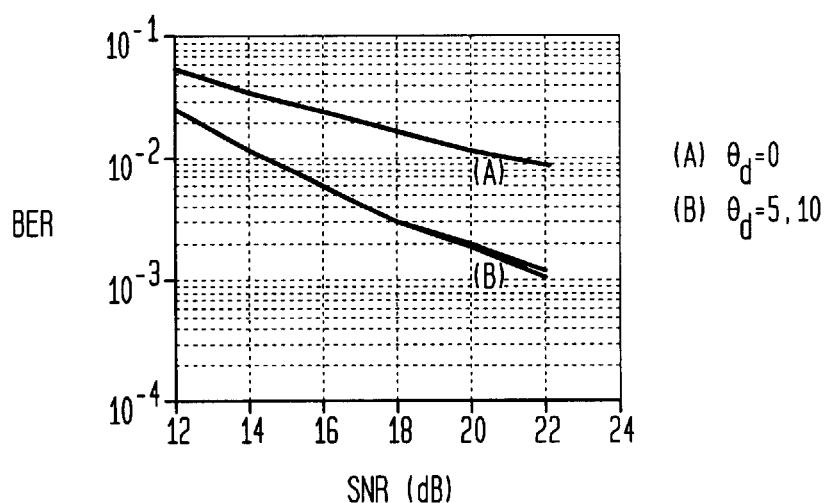
FIG. 8 is a graph illustrating BER performance gains for a receiver experiencing single-path Rayleigh fading and having a zero delay difference in accordance with the present invention.
Figure 9:
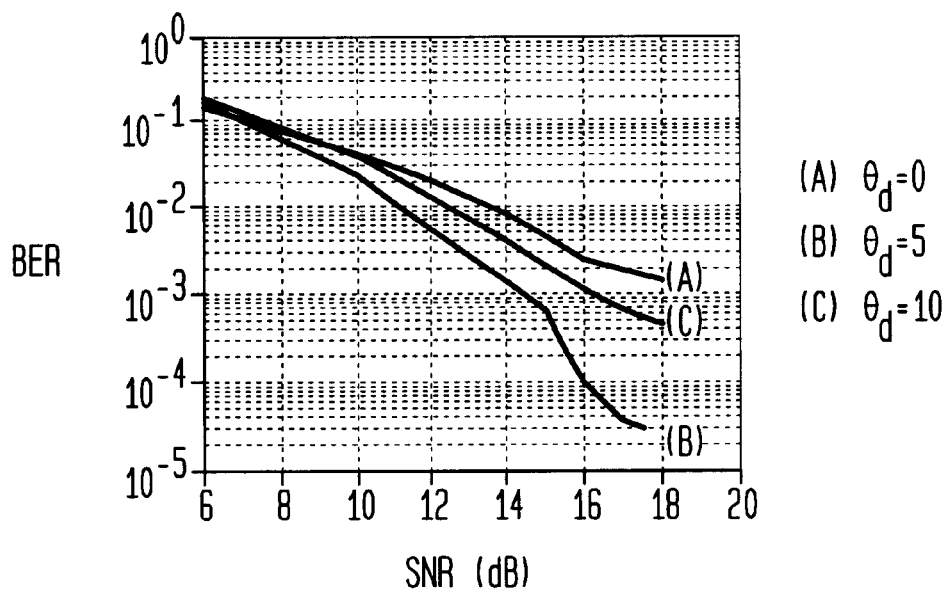
FIG. 9 is a graph illustrating BER performance gains for a receiver having a one micro-second delay difference and traveling at 100 km/hr in accordance with the present invention.
Figure 10:
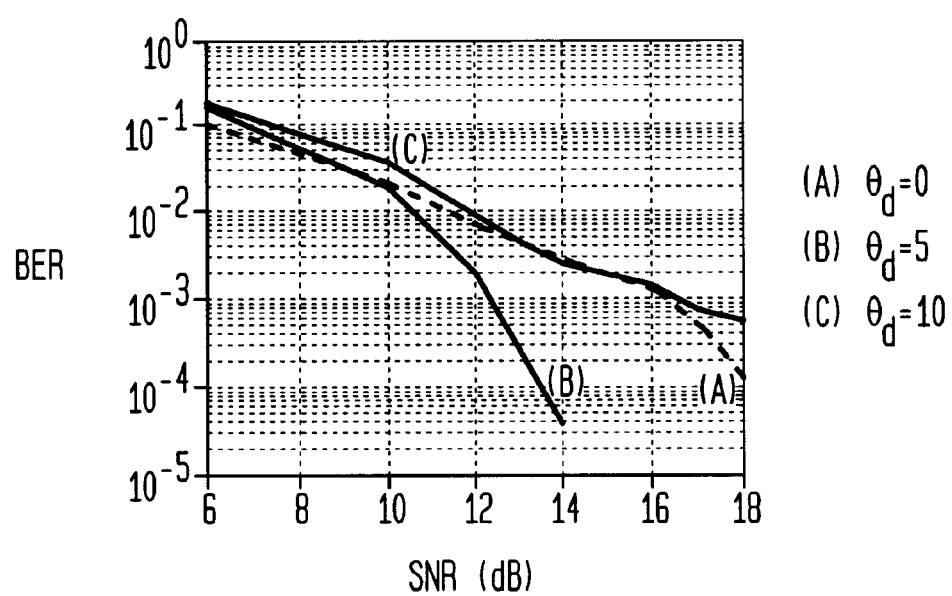
FIG. 10 is a graph illustrating BER performance gains for a receiver having a one micro-second delay difference and traveling at 5 km/hr in accordance with the present invention.

Next, let us consider a Rayleigh fading channel model. FIGS. 8, 9, and 10 show results for various receiver speeds and delay differences at the receivers in single-path Rayleigh fading channels with and without transmit diversity in accordance with the present invention. In FIG. 8, the results are given when the delay difference between the two transmitters is negligible and for a mobile speed of 100 km/h. Without the transmit diversity technique (trace a), the performance of this system would be very poor. As can be seen, the diversity scheme (trace b) leads to very large gain in performance. Note that since the mobile speed is 100 km/h, time variations within the 250 $\mu$s OFDM symbol are not negligible and this leads to an error flow at larger SNR values. FIG. 9 shows the case when the delay difference between the two transmitters is 1 $\mu$s and the mobile speed is 100 km/h. This delay difference lends itself to some frequency diversity. As can be seen by comparing trace b to trace a, introducing the transmit diversity technique gives rise to lower BERs.

The performance of the OFDM system at 5 km/h and two transmitters is given in FIG. 10. These are single path Rayleigh fading channels with a path difference of 1 $\mu$s. Note that because of negligible time variations within an OFDM symbol, the performance of this system is better than the corresponding 100 km/h case. The diversity gain obtained for $\theta_d$=5 deg. is about 4 dB at BER=10$^{-4}$. Note that because of the large variation across the sub-carrier components, the performance of the system for $\theta_d$=10 deg. is slightly worse than in the absence of this diversity technique.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for improving diversity in a multiple transmitter orthogonal frequency division multiplexing system, comprising the steps of:
   receiving a data signal at a first transmitter and a second transmitter;
   processing said data signal at said first transmitter and at said second transmitter to generate a plurality of differentially encoded complex symbols at said first and second transmitters; and
   introducing first phase offsets to said plurality of differentially encoded complex symbols at said first transmitter in the frequency domain to generate a first stream of transmit symbols;
   introducing second phase offsets to said plurality of differentially encoded complex symbols at said second transmitter in the frequency domain to obtain a second stream of transmit symbols;
   transforming said first and second streams of transmit symbols from the frequency domain to the time domain; and
   transmitting said first and second streams of transmit symbols in the time domain from said first and second transmitters, respectively, such that said first and second streams of transmit symbols at said first transmitter and at said second transmitter have unique phase offsets.

2. The method of claim 1, wherein said first phase offsets are zero degrees.

3. The method of claim 1, wherein said step of introducing first phase offsets comprises assigning a first unique phase offset value to said first transmitter and incrementally rotating each of said plurality of differentially encoded complex symbols more than a preceding one of said plurality of differentially encoded complex symbols by said first unique phase offset; and said step of introducing second phase offsets comprises assigning a second unique phase offset value to said second transmitter and incrementally rotating each of said plurality of differentially encoded complex symbols more than a preceding one of said plurality of differentially encoded complex symbols by said second unique phase offset, such that a phase of each of said plurality of differentially encoded complex symbols in said first transmitter is different from a phase of corresponding differentially encoded complex symbols in said second transmitter.

4. The method of claim 3, wherein said first unique phase offset and said second unique phase offset are between negative 10 degrees and positive 10 degrees.

5. The method of claim 4, wherein said first unique phase offset is zero degrees.

6. The method of claim 1, wherein said step of introducing first phase offsets comprises rotating each of said plurality of differentially encoded complex symbols by a first random phase offset chosen from within a first range of determined phase offsets; and said step of introducing second phase offsets comprises rotating each of said plurality of differentially encoded complex symbols by a second random phase offset chosen from within a second range of determined phase offsets, wherein said first random phase offset and said second random phase offset are unequal.

7. The method of claim 6, wherein said first and second ranges of determined phase offsets are between zero degrees and positive 10 degrees.

8. The method of claim 1, wherein said step of introducing first phase offsets comprises rotating each of said plurality of differentially encoded complex symbols by a first randomly chosen phase offset within a range between a first negative value and a first positive value; and said step of introducing second phase offsets comprises rotating each of said plurality of differentially encoded complex symbols by a randomly chosen phase offset within a range between a second negative value and a second positive value.

9. The method of claim 8, wherein said first and second determined phase offsets are between zero and 10 degrees.

10. A method for transmitting a digital data signal on a frequency division multiplex system using at least two transmitters, each transmitter corresponding to a communication channel, the method comprising the steps of:

applying a channel code to a digital signal to generate a sequence of sub-carrier symbols;

applying first phase offsets to said sequence of sub-carrier symbols in the frequency domain at a first transmitter, said offsets unique to said first transmitter, to obtain a first sequence of phase offset symbols;

applying second phase offsets to said sequence of sub-carrier symbols in the frequency domain at a second transmitter, said offsets unique to said second transmitter, to obtain a second sequence of phase offset symbols;

a transforming said first and second sequence of phase offset symbols from the frequency domain to the time domain; and transmitting said first and second sequence of phase offset symbols in the time domain from said first and second transmitters, respectively, such that frequency diversity is increased in the frequency division multiplex system.

11. The method of claim 10, wherein said first and second phase offsets are introduced deterministically.

12. The method of claim 11, wherein the phase difference between adjacent sub-carrier symbols at each of said first and second transmitters is less than 10 degrees.

13. An orthogonal frequency division multiplexing transmission system for transmitting a data signal comprising:

a plurality of transmitters (i), each of said transmitters comprising;

a coder coupled to said data signal, said coder generating a differentially encoded complex signal comprising a plurality of complex symbols (n);

a rotator coupled to said coder for introducing a phase offset in the frequency domain, said offset unique to each of said plurality of transmitters, to each of said plurality of complex symbols (n), wherein said phase offset is unique for each of said plurality of transmitters (i);

an inverse Fourier transformer coupled to said rotator for transforming said differentially encoded complex signal from the frequency domain to the time domain to prepare said differentially encoded complex signal for transmitting; and wherein said transmitted plurality of differentially encoded complex signals are capable of being received by a single receiver.

14. The transmission system of claim 13, wherein each of said coders comprises:

a convolutional coder coupled to said data signal;

a quantary phase shift keyer coupled to said convolutional coder;

an interleaver coupled to said quantary phase shift keyer; and a differential coder coupled between said interleaver and said rotator, said differential coder passing said differentially encoded complex signal to said rotator.

15. The transmission system of claim 14, wherein said phase offset for the $n^{th}$ symbol of the $i^{th}$ transmitter is $$\alpha^i_n = in\theta_d$$

where $\theta_d$ is the step-size.

16. The transmission system of claim 15, wherein said step-size is a value chosen between 0 and 10 degrees.

17. The transmission system of claim 14, wherein said phase offset for the $n^{th}$ symbol of the $i^{th}$ transmitter and said phase offset for a preceding symbol has a phase difference given by $$\alpha^i_n - \alpha^i_{n-1} = i\theta_n$$

where $\theta_n$ is an independent random process and is uniformly distributed in $[0, \theta_d]$, where $\theta_d$ is the step-size.

18. The transmission system of claim 17, wherein said step-size is a value chosen between 0 and 10 degrees.

19. The transmission system of claim 14, wherein said phase offset for the nth symbol of the $i^{th}$ transmitter and said phase offset for a preceding symbol has a phase difference given by $$\alpha^i_n - \alpha^i_{n-1} = i\theta_n$$

where $\theta_n$ is an independent process and assumes the values $\pm\theta_d$ with equal probability, where $\theta_d$ is the step-size.

20. An orthogonal frequency division multiplexing receiver system for receiving a data signal comprising:

a plurality of receivers (i), each of said receivers comprising;

a receiver circuit coupled to receive a differentially encoded complex data signal comprising a plurality of complex symbols (n);

a Fourier transformer coupled to said receiver for transforming said differentially encoded complex signal from time domain to frequency domain;

rotator coupled to said Fourier transformer for introducing a phase offset in the frequency domain, said offset unique to said each of said plurality of receivers, to each of said plurality of complex symbols (n), wherein said phase offset is unique for each of said plurality of receivers (i); and a combiner for combining said differentially encoded complex signal in the frequency domain after rotating; and a differential decoder for decoding said differentially encoded complex signal in the frequency domain after rotating and combining.

21. The receiver system of claim 20, wherein said decoder comprises:

a differential decoder coupled to said combiner;

a de-interleaver coupled to said differential decoder;

a quantary phase shift keyer de-modulator coupled to said de-interleaver; and a convolutional de-coder coupled to said quantary phase shift keyer de-modulator.

22. The receiver system of claim 21, wherein said phase offset for the nth symbol of the $i^{th}$ receiver is $$\alpha^i_n = in\theta_d$$

where $\theta_d$ is the step-size.

23. The receiver system of claim 22, wherein said step-size is a value chosen between 0 and 10 degrees.

24. The receiver system of claim 21, wherein said phase offset for the nth symbol of the ith receiver and said phase offset for a preceding symbol has a phase difference given by $$\alpha^i_n - \alpha^i_{n-1} = i\theta_n$$

where $\theta_n$ is an independent random process and is uniformly distributed in $[0, \theta_d]$, where $\theta_d$ is the step-size.

25. The receiver system of claim 24, wherein said step-size is a value chosen between 0 and 10 degrees.

26. The receiver system of claim 21, wherein said phase offset for the $n_{th}$ symbol of the $i^{th}$ receiver and said phase offset for a preceding symbol has a phase difference given by $$\alpha^i_n - \alpha^i_{n-1} = i\theta_n$$

where $\theta_n$ is an independent process and assumes the values $\pm\theta_d$ with equal probability, where $\theta_d$ is the step-size.

27. The receiver system of claim 26, wherein said step-size is a value chosen between 0 and 10 degrees.

* * * * *